May 28, 1963
G. BUDNICK ET AL
3,091,125
METHOD AND APPARATUS FOR DYNAMICALLY
DETERMINING UNBALANCE OF ROTORS
Filed June 11, 1959
2 Sheets-Sheet 1
FIG. 1
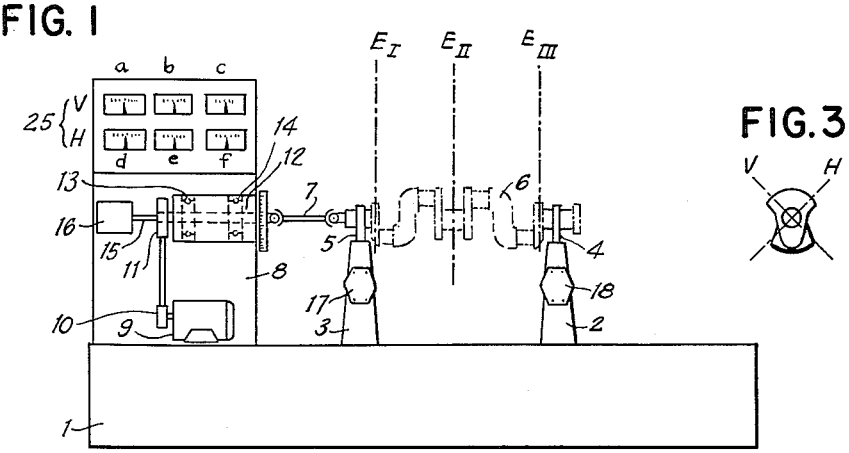
FIG. 3
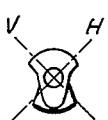
FIG. 4
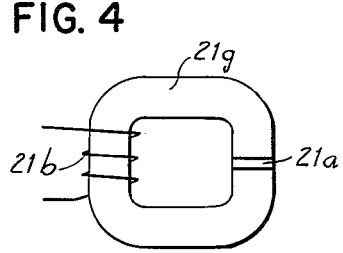
FIG. 5
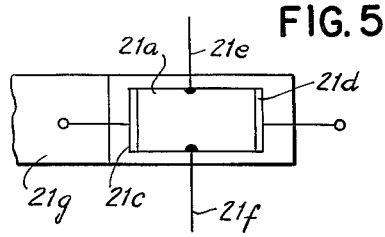
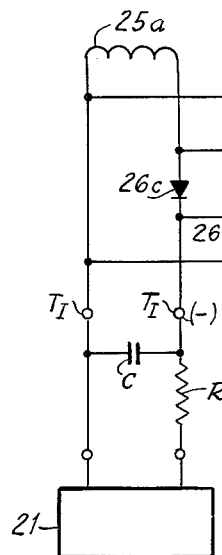
FIG. 6

United States Patent Office
3,091,125
Patented May 28, 1963

3,091,125
METHOD AND APPARATUS FOR DYNAMICALLY DETERMINING UNBALANCE OF ROTORS
Gunther Budnick, deceased, late of Darmstadt, Germany, by Thea Budnick, nee Wujanz, heir, Darmstadt, Germany, Heinrich Hack and Reinhard Alffen, Darmstadt, and Ludwig Arras, Gross-Zimmern, Germany, assignors to Carl Schenck Maschinenfabrik G.m.b.H., Darmstadt, Germany, a corporation of Germany
Filed June 11, 1959, Ser. No. 819,732
7 Claims. (Cl. 73—462)

Our invention relates to methods and apparatus for dynamic unbalance analysis of rotating workpieces relative to one or more chosen planes of reference. More particularly, the invention involves the principle of providing two alternating voltages jointly indicative of magnitude and phase position of the unbalance, forming a mathematical product of the two alternating voltages, and applying the result, for indicating, controlling or computing purposes, as a criterion of the magnitude and phase position of the unbalance.

In known balancing apparatus operating on this principle, the product of the two alternating voltages is formed in an electro-mechanical measuring instrument or by means of electronic tube circuits. For example, it is known to form the product in a wattmeter which directly indicates the unbalance data by pointer deflection. In known electronic tube circuits used for such purposes, a pulsating direct voltage is produced which serves for the control of indicating, recording, controlling or computing devices.

The known balancing apparatus equipped with wattmeters require relatively simple instrumentalities and are of high accuracy; but due to the use of indicating instruments, they are not directly applicable for automatic control purposes such as for the control of balance-correcting machinery. For adapting wattmetric devices to such purposes, relatively complicated accessories are needed, such as control instruments with selector switch contacts, photoelectric scanning devices, and similar translating means that sense the pointer deflection of the wattmeter and translate it into a control operation as required for a dependently operated device, such as a computer or unbalance-correcting machine tool. These additional accessories are expensive and, in many cases, involve trouble-susceptible components, for example mechanical contacts, and hence require continual supervision and maintenance if a reliable performance is to be secured. The known balancing apparatus operating with electronic tube circuits are intricate and sensitive and thus often unsatisfactory in practice because of their high cost and lack of desired ruggedness.

It is an object of our invention to devise methods and apparatus for dynamic analysis of rotor unbalance, that eliminate the above-mentioned shortcomings of the voltage-multiplying methods and devices heretofore available for such purposes. Another, more specific object is to provide a balance analyzing method and apparatus which require relatively little expenditure as regard components, space and cost, and afford a maximum of reliability and performance while providing an electric output voltage or current indicative of the voltage product to be formed and suitable for the control or operation of other devices, as required, for example in full-automatic balancing plants.

To achieve these objects, and in accordance with our invention, we utilize the Hall effect of semiconductors for forming a voltage as the product of two alternating input voltages which are in synchronism with each other and are furnished respectively by an electro-mechanical transducer which converts the unbalance-responsive mechanical vibrations of the workpiece into a first alternating voltage, and by a phase-reference voltage whose frequency, like that of the transducer voltage, is the same as the rotation frequency of the workpiece. Due to the synchronism of the two alternating input voltages, the result of the multiplying operation consists of, or includes, a pulsating direct voltage, whereby the output voltage of the Hall-effect device is conveniently applicable for the control of the indicating, recording, controlling or computing means that are to respond in accordance with the unbalance data of the rotating workpiece.

According to another feature of the invention, we provide a method and apparatus in which a plurality of Hall-voltage generating devices are used for measuring the rotor unbalance in two arbitrarily chosen reference planes, and we impress the product of the two input voltages relating to each of said respective planes upon a selected one of a group of voltage receiving devices, depending upon the particular measuring result obtained for the individual planes. This makes it possible to transfer the measured results of product formation from the two above-mentioned reference planes to a different balance-correction plane, without any necessity for actuating a mechanical contact switch or other non-static components. This is of particular importance for the balancing of crank shafts which can be balance corrected only at their counterpoises located in different radial planes. The invention, relative to its last-mentioned aspect, is also of advantage for analyzing and correcting unbalance in shaft-elastic bodies which require balance correction not only in two terminal planes but also at points located between these planes along the rotation axis of the workpiece.

The foregoing objects, advantages and features will be explained, and further features of the invention will be described hereinafter in conjunction with the balance-analyzing apparatus illustrated by way of example on the accompanying drawing in which:

FIG. 1 is a front view of a machine for balancing crank shafts, seen from the attendant's place.

FIG. 3 is a lateral view of the crank shaft according to FIG. 1 and serves to identify two coordinate axes of respective unbalance components to be determined in an individual reference plane.

Figure 2:
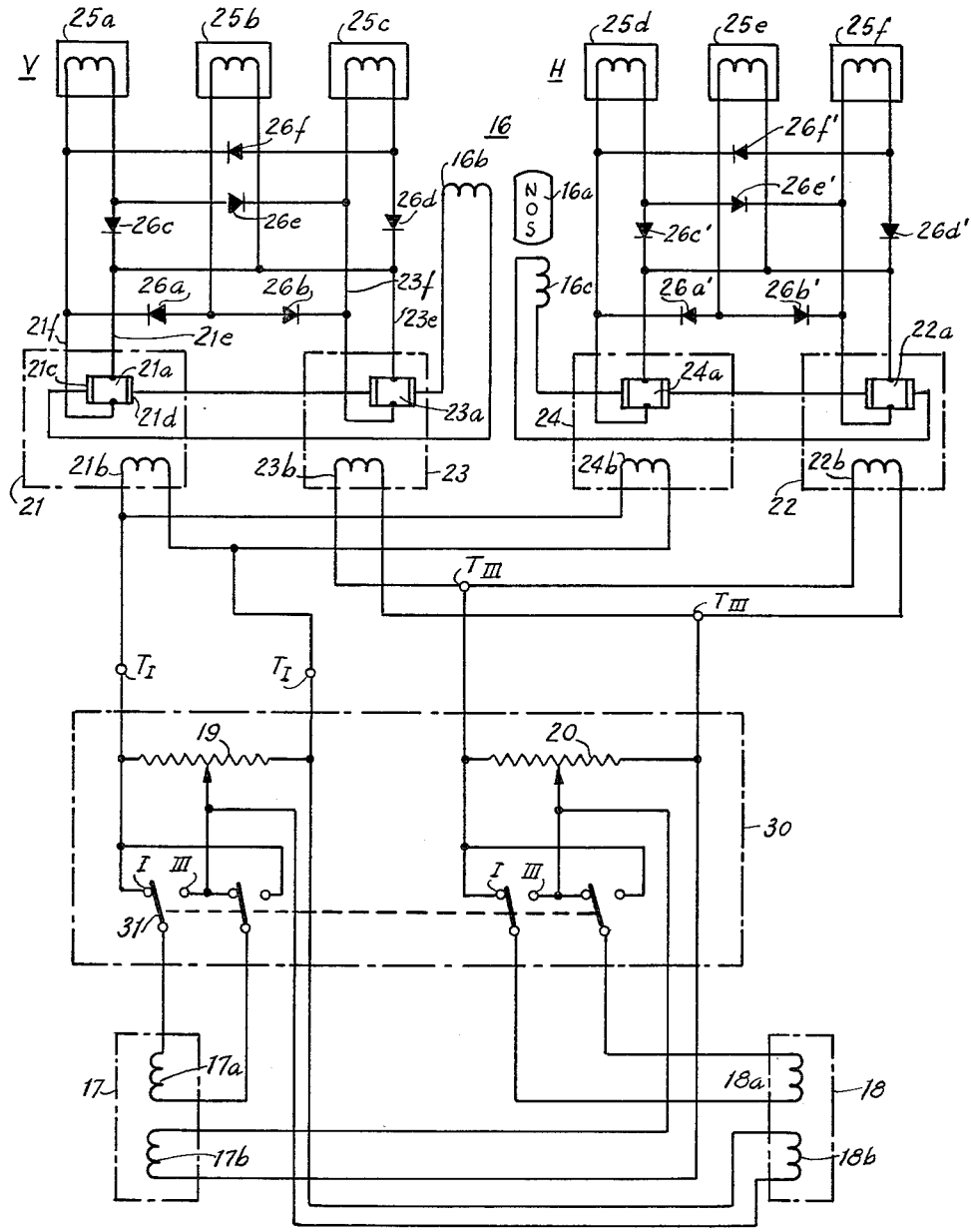
FIG. 2 is a schematic circuit diagram relating to the same machine and affording a balancing operation relative to two reference planes as well as an automatic transfer of the measured values to a third plane if the balance correction is to be made in the latter plane.

FIG. 4 schematically illustrates one of the Hall generators used in the system of FIG. 2.

FIG. 5 is a view onto one of the pole faces of the Hall generator; and

FIG. 6 is an explanatory diagram corresponding to a portion of FIG. 2.

The base 1 of the machine shown in FIG. 1 carries two bearing supports 2 and 3 on which respective roller bearings 4 and 5 are mounted. The workpiece, consisting of a crank shaft 6, has its two outer shaft portions placed onto the roller bearings and, during operation of the machine, is driven through a cardanic shaft 7. Mounted in a housing 8 of the machine is an electric motor 9 which drives the workpiece by means of a belt transmission comprising a belt sheave 10 on the motor shaft and a sheave 11 on a shaft 12 to which the cardanic shaft 7 is linked. The shaft 12 is journalled in housing 8 by means of two ball bearings located at 13 and 14.

A coupling or shaft 15 connects an alternating-current generator 16 with the drive shaft 12 and hence with the crank shaft 6 so that the generator operates in synchronism with the workpiece rotation. The generator 16 serve to provide a phase-reference voltage and may consist of an electrodynamic sine-wave generator or any other phase-reference source conventional for such purposes. Mounted in the upper portion of the housing 8 is a measuring device 25 composed of six individual instrument units 25a to f. Mounted on supports 2 and 3 are respective electric transducers 17 and 18 consisting, for example, of vibration pickups of the electrodynamic type.

Aside from the provision of the six instrument units mentioned above, the design of the machine so far described is essentially conventional. It will be understood that, like in conventional balancing machines, the bearings 4 and 5 for the rotating workpiece are mounted on springs so as to be capable of oscillating motion in response to any unbalance inherent in the workpiece 6, the oscillation of each bearing structure being limited to substantially linear motion in a direction perpendicular to the plane of illustration. Any such vibrations are sensed by the respective pickups 17 and 18 which translate the vibrations into respective alternating voltages.

Indicated in FIG. 1 are two primary reference planes $E_I$ and $E_{III}$ which extend radially of the rotor axis in the vicinity of the respective pickups 17 and 18. Further indicated in FIG. 1 is a third reference plane $E_{II}$ which may represent any chosen plane relative to which it is also desired to determine the unbalance of the crank shaft although no pickup is assigned to the latter plane.

According to FIG. 2, each of the two pickups 17 and 18 has two voltage generating coils 17a, 17b and 18a, 18b which are connected to a potentiometric device 30 comprising a two-position switch 31 and two adjustable voltage dividers 19 and 20. The tapped-off voltage appearing across the output terminals $T_I$ is indicative only of the unbalance effect in the reference plane $E_I$ and the voltage across the output terminals $T_{III}$ is indicative only of the unbalance effect in the reference plane $E_{III}$. The potentiometer network device 30 is conventional and thus needs no further description, a more detailed explanation being available, for example, in the book Dynamics of Machinery, by James B. Hartman, McGraw-Hill Book Company, Inc., New York, 1956, pages 148 to 150.

Departing from the conventional unbalance analyzing devices, the terminals $T_I$ are connected to a pair of Hall generators 21 and 24, and the terminals $T_{III}$ are connected to another pair of Hall generators 23 and 22.

Before continuing the description of the circuit diagram shown in FIG. 2, it will be helpful to briefly describe the essential features and operation of the Hall generators with reference to FIGS. 4 and 5 which refer to the Hall generator 21, the three others being of the same design and performance.

As shown in FIG. 4, the Hall generator comprises a magnetizable core structure 21g in whose air gap a resistance member (Hall plate) 21a of semiconducting material such as indium antimonide or indium arsenide is disposed, The core carries an excitation winding 21b. The Hall plate, usually of wafer thickness, possesses two electrodes 21c and 21d which form terminals for passing an energizing current through the Hall plate. The plate is further provided with two probe electrodes (Hall electrodes) to which respective output leads 21e and 21f are attached. When an electric current passes through the Hall plate between terminal electrodes 21c and 21d while the excitation coil 21b is deenergized so that the magnetic field in the gap has the zero value, the two probe electrodes have the same electric potential so that no voltage is impressed between the leads 21e and 21f. However, when the coil 21b is excited so that a magnetic field is effective in the gap simultaneously with the current flow through the Hall plate, the two probe electrodes assume respectively different potentials so that an output voltage (Hall voltage) appears between the leads 21e and 21f, this voltage being proportional to the vectorial product of the magnetic field strength and the current intensity, thus being also proportional to the product of the two voltages which excite the coil 21b and drive current through the Hall plate respectively. The above-described fundamental design and performance of a Hall-voltage generating device are known as such.

Reverting to FIG. 2, it will be noted that the voltage from terminals $T_I$ is applied to the excitation coils 21b and 24b of respective Hall generators 21 and 24, and that the voltage from terminals $T_{III}$ is analogously applied to the excitation coils 23b and 22b of respective devices 23 and 22.

The phase-reference generator 16 comprises a rotor 16a and two stator windings 16b and 16c displaced 90° relative to each other. These two windings generate a sine voltage and a cosine voltage in synchronism and given phase relation to the rotation of the workpiece. The voltage generated by winding 16b is applied to the Hall generators 21 and 23 whose respective Hall plates are thus traversed by alternating current in synchronism with, and given phase relation to the workpiece rotation. Analogously, the voltage of winding 16c drives a corresponding alternating current through the Hall plates of devices 22 and 24.

As explained, the Hall voltage impressed between leads 21e and 21f of Hall generator 21 is proportional to the product of the pickup voltage applied to coil 21b times the voltage supplied from windings 16b of the phase reference generator. This applies analogously to the three respective voltages issuing from the Hall generators 22, 23 and 24.

The output leads 21e and 21f of Hall generator 21 are connected to the instrument unit 25a in series with an electric valve or diode 26c. Similarly, the Hall generator 22 has its output leads connected with instrument unit 25f in series with a diode 26d'. The Hall generator 23 is connected to instrument unit 25c through a diode 26d and the Hall generator 24 has its output leads connected to the instrument unit 25d through a diode 26c'. The output leads 21e and 23e of respective Hall generators 21 and 23 are connected with each other and with one terminal of the instrument unit 25b. The other terminal of unit 25b is connected with lead 21f through a diode 26a and with lead 23f through a diode 26b, the diodes 26a and 26b being poled in voltage opposition to each other. A diode 26e is connected between lead 23f and a point located between instrument unit 25a and diode 26c. A diode 26f is connected between lead 21f and a point of the circuit extending from diode 26d to instrument unit 25c, the proper poling of all diodes being apparent from the drawing.

The instrument unit 25e is connected with the Hall generators 22 and 24 by a network which comprises the above-mentioned diodes 26c', 26d' as well as further diodes 26a', 26b', 26e', and 26f', the network of diodes being a duplicate of that described above with reference to instrument unit 25b.

With regard to the connection of Hall generator 21 with instrument unit 25a, the "vertical" unbalance component $E_Iv$ in reference plane $E_I$ is indicated by the instrument unit 25a if the measuring voltage impressed across the output leads 21e and 21f is positive so that current can flow through the diode 26c. Relative to the term "vertical" unbalance component, it will be noted from FIG. 3 that the apparatus is designed to indicate the unbalance in each reference plane in form of two coordinate components in directions denoted in FIG. 3 by V (vertical) and H (horizontal), it being understood that the designations "vertical" and "horizontal" are used only for convenience since these components may have any desired directions except that it is preferable to have them extend at a right angle to each other.

Correspondingly, the unbalance component $E_{III}v$ is indicated in instrument unit 25c provided the output voltage of Hall generator 23 is positive so that current can flow through diode 26d. Analogously, in the event of positive output voltages, the unbalance component $E_Ih$ is indicated in instrument unit 25d and the unbalance component $E_{III}h$ in instrument unit 25f.

If the instrument units are indicating devices as shown in FIG. 1, the unbalance components $E_Iv$ indicated in unit 25a and the unbalance component $E_Ih$ indicated in unit 25d represent the amount and angular position of the corrective addition or elimination of mass to be effected in the correction plane $E_I$, that is, on the cheek of the crank shaft 6 located in that plane (FIG. 1). Analogously, the unbalance indications $E_{III}v$ in unit 25c and $E_{III}v$ in unit 25f indicate the amount of correction to be made in plane $E_{III}$ and hence on the cheek of the crank shaft located in that plane according to FIG. 1.

Due to the particular shape of the crank shaft 6, however, an unbalance of negative polarity cannot be corrected in plane $E_I$ or $E_{III}$ but must be corrected in the plane $E_{II}$ or the crank cheeks adjacent to the latter plane. Consequently, if the output voltage of generator 21, indicative of the unbalance component $E_Iv$ is negative, it must be impressed additively upon the instrument unit 25c, and analogously any negative voltage of generator 23 must be supplied to the instrument unit 25a in the additive sense. Furthermore, the negative output vlotage, or the greater one of the two negative voltages as the case may be, must be impressed upon the instrument unit 25b in the positive sense. The diodes 26a to 26f serve the just mentioned purposes. The same performance is achieved relative to the generators 22 and 24 by means of diodes 26a' to 26f' which cause any negative output voltages from generators 22 and 24 to act upon the instrument unit 25e assigned to the correction plane $E_{II}$ and indicating the horizontal component of unbalance or the corresponding magnitude of the required unbalance correction.

The above-described operation will be more fully understood from the following.

The output voltage U of each Hall generator is the product of the two input voltages $U_1$ and $U_2$, both being alternating voltages of the same frequency and defined by:

$$U_1 = A \sin \omega t$$
$$U_2 = B \sin (\omega t + \varphi)$$

wherein A and B are constants. The product voltage follows as:

$$U = U_1 \cdot U_2 = \frac{AB}{2} \cos \varphi - \frac{AB}{2} \cos (2\omega t + \varphi)$$

In this equation, the term $$\frac{AB}{2} \cos \varphi$$

is a direct-voltage component which is proportional to the phase angle $\varphi$ between the two alternating voltages $U_1$ and $U_2$. In the above-described apparatus according to the invention, only this direct-voltage component is utilized. The remaining term, representing an alternating voltage, is suppressed or eliminated.

The elimination of the alternating voltage component is effected by virtue of the fact that the measuring instruments, or any intermediate amplifier connected to the output terminals of the Hall generator, form the integral value of the voltage applied thereto. This also applies to the operation of any amplifier (not shown) that may be connected between the Hall generator and the above-described network of diodes. The elimination of the alternating voltage component may be due to inherent filtering action of the instruments being used. For example, if in FIG. 2 the instrument units are moving-coil instruments whose natural frequency is considerably lower than the frequency of the alternating-voltage component, the instruments respond only to the direct-voltage component. In this case the instruments are preferably voltmeters of high internal resistance.

An example of a by-pass filter for the alternating voltage component is illustrated in FIG. 6 as consisting, for example, of a capacitor C and a resistor R.

It will be recognized, therefore, that the utilized output voltage of each of the Hall generators is a direct voltage which may assume positive or negative polarity. With the voltage polarities at terminals $T_I$ and $T_{III}$ indicated (by + and −) in FIG. 6, for example, the output voltage of Hall generator 21 across terminals $T_I$ is positive and the corresponding voltage of generator 23 at terminals $T_{III}$ is also positive. Under these conditions, the positive voltage of generator 21 drives current through unit 25a and diode 26c so that the amount of voltage is indicated or responded to by the unit 25a, and the positive voltage of generator 23 drives current through unit 25c and diode 26d so that this voltage is responded to by unit 25c, but no current can flow through the unit 25b because of the blocking action of diodes 26a and 26b.

Now assume that the voltage of generator 21 is positive and the voltage of generator 23 negative. Then the full voltage of generator 23 is applied through diode 26b to the instrument unit 25b. The negative voltage of generator 23 is further applied through diode 26e across the diode 26c where the voltage acts in the blocking direction of diode 26c. Consequently, the unit 25a now indicates the sum of the two Hall voltages.

Further assume that the output voltage of generator 21 is negative, and the output voltage of generator 23 is positive and amounts to only one half of the voltage from generator 21. In this case the instrument unit 25a indicates zero voltage because the voltage of generator 21 is greater than that of generator 23 so that the diode 26c blocks the flow of current through unit 25a. Unit 25b now receives current through diode 26a and indicates the larger one of the two Hall voltages, and unit 25c indicates the difference between the two voltages.

The invention is particularly significant and most advantageous in such cases of industrial balancing practice where it is infeasible to eliminate the unbalance of a rotating workpiece in the same plane in which the unbalance is measured. This happens, for example, if the unbalance must be corrected by elimination rather than by addition of material, and if the material of the workpiece at the particular location is insufficient for such elimination. In such cases, the unbalance value determined with respect to one reference plane must be modified, usually by calculation, and must be transferred to a given different plane where the possibility of unbalance correction by removal of workpiece material is available. Such transposition of measured unbalance from a reference plane to a different correction plane must also take into account the unbalance effects occurring in the other reference planes.

The just mentioned problem occurs most frequently in the technique of balancing crankshafts for internal combustion engines, and will therefore be more fully explained presently with reference to the example of a crankshaft for a four-cylinder engine. Such a crankshaft has two outer crank checks which also serve as counterpoises. In most cases, the unbalance is determined on the balancing machine with respect to two reference planes ($E_I$, $E_{III}$ in FIG. 1) located at these two outer counterpoises. In these two planes, however, a correction of unbalance can be made only if the gravity center of the unbalance lies in an angular range between about 0° and 90° because the counterpoises possess sufficient material only in this range to permit unbalance correction by drilling.

In other words, a vectorial unbalance correction in these two preferred reference planes can be made only if the measured vectorial amounts of unbalance fall into this range; or if the balance correction is made in accordance with the "two-components method" (balancing in two predetermined locations on a Cartesian system of coordinates), an unbalance correction in these two reference planes is possible only if the unbalance components at 0° or 90° have positive (+) signs.

If this condition is not met, a substitute plane must be chosen for unbalance correction, for example the plane of an intermediate counterpoise or the middle or symmetry plane ($E_{II}$ in FIG. 1) of the combined centrally located counterpoises. In such a substitute plane, an unbalance correction by drilling can be made in the angular range of about 180° to 270°, because here the correction possibilities are just 180° displaced from the correction possibilities in the two outer reference planes.

For example, assume that the unbalance, measured in coordinate components, is as stated in the following table I:

TABLE I

| Planes | $E_I$ | $E_{III}$ |
|---|---|---|
| Components: | | |
| Vertical | +14 | +7 |
| Horizontal | +3 | +11 |

These measured values are all positive. Hence, a correction can be made in the two outer reference planes $E_I$ and $E_{III}$ (FIG. 1), these being the same respective planes in which the unbalance values were measured. At 0° in plane $E_I$ a correction must be made corresponding to 14 scale divisions (units). At the angular position 90° a correction must be made corresponding to 3 units, etc.

If any of the tabulated four values were negative, a substitute correction plane would have to be choosen. For example, assume that the four measured values are those given in the two upper horizontal data lines of table II presented below. Then a substitute correction plane differing from $E_I$ and $E_{III}$ must be chosen, and the amount of correction in the substitute plane must be calculated from the values measured.

Heretofore, the following two methods have been used thus calculating the mass correction required in the substitute plane.

1. Addition Method

If one or two of the component values in a line of the tabulation are negative, the greatest negative value, after reversing its sign, is added to all values of this line. The previously empty middle columns are then also taken into consideration, so that the result as shown in the lower two horizontal lines of table II is obtained:

TABLE II

PRIOR TO CALCULATION

| Planes | $E_I$ | | | $E_{III}$ |
|---|---|---|---|---|
| Components: | | | | |
| Vertical | −14 | | | −7 |
| Horizontal | −3 | | | +11 |

AFTER CALCULATION

| Components: | | | | |
|---|---|---|---|---|
| Vertical | 0 | 14 | 14 | +7 |
| Horizontal | 0 | 3 | 3 | +14 |

After calculation, only positive values are contained in the tabulation. The unbalance can then be corrected in accordance with these positive values.

In the foregoing numerical example, no correction is to be made in the left refeernce plane $E_I$. In the middle plane, now used as substitute correction plane, a correction is necessary at 180°, corresponding to 28 (=2·14) mass units. A correction is also necessary in plane $E_{II}$ at 270°, corresponding to 6 (=2·3) units. In the right-hand correction plane $E_{III}$, 7 units must be compensated (drilled away) at 0°, and 14 units at 90°.

The foregoing is based on the assumption that the planes of the two middle counterpoises of the four-cylinder crankshaft are combined to a single middle plane $E_{II}$ (FIG. 1). This is permissible because the two counterpoises in the middle have the same phase (angular) position.

Of course, in lieu thereof, separate corrections at each of the two middle counterpoises may be made, each corresponding to 14 mass units in the above example.

The accuracy of the above-described addition method is predicated upon the fact that in each unbalance-compensating direction, 0°–180° or 90°–270°, the locations of the corrections in the planes $E_I$, $E_{II}+E_{II}$ and $E_{III}$ are symmetrical to the crankshaft center and that no external centrifugal moments or centrifugal forces are produced if the same amount of material is added or taken away at all four locations.

2. Network-Changing Method

This method requires the preparation of three unbalance-analyzing electric networks: one for the two reference planes $E_I$ and $E_{III}$, another one for the reference plane $E_I$ and the auxiliary plane $E_{II}$, and a third network for the planes $E_{II}$ and $E_{III}$. These networks are so designed that the unbalance values in the middle plane $E_{II}$ are indicated with reversed sign. This takes into account the fact that the correction possibilities in the middle plane are 180° displaced from those of the outer planes. When effecting the unbalance correction for each component direction, only the one particular network is used which furnishes two positive values at the indicating instrument.

With this method, too, it may happen that relative to the "vertical" component direction (at 0° or 180°) the unbalance correction must be made in a pair of planes different from those used for making a correction with respect to the "horizontal" component direction (at 90° or 270°).

Heretofore, when operating in accordance with the first (addition) method, the necessary calculation has been made by an attendant, using a computer, if desired. The second (network-changing) method also requires skilled attention by personnel and involves a comparatively very great expenditure in equipment.

In order to measure unbalance in one or more given planes ($E_I$, $E_{III}$) and to transpose the measured values into correction values for at least one other plane ($E_{II}$), in a completely automatic manner and with a relatively small expenditure as to equipment and space requirements, the present invention requires the use of voltage-multipliers as more specifically set forth in the claims. The so-called Hall generators are particularly well suitable because they operate, like a wattmeter, as product-forming devices, and furnish at their output terminals a direct voltage which is not only proportional to the scalar value of the product but also has a polarity indicative of the (+, −) sign of the product.

The above-mentioned second numerical example of unbalance correction (Table II) is used to explain the functioning of the apparatus illustrated in FIG. 2 of the present application.

The two component unbalance values for each original reference plane ($E_I$, $E_{III}$) are available as alternating voltages at the respective input circuits (21b, 23b) of the two Hall generators 21 and 23. A constant alternating voltage is supplied from the phase-transmitter winding 16b to the second input circuit of each Hall generator. The alternating voltages (from the pickups 17, 18) that correspond to the unbalance of the workpiece are thus multiplied in the two Hall generators with the alternating reference voltage from the phase transmitter. The zero value of the alternating output voltage, which appears at the output terminals of the Hall generators and constitutes the product of the two input voltages, is displaced in the positive or negative direction depending upon the phase displacement between the two alternating input voltages of each Hall generator. As a result, the Hall-generator output voltage has a direct-voltage component, and this latter component is utilized for the purposes of the present invention.

In the example here contemplated, the voltage which corresponds to the unbalance indication of −14 scale divisions for plane $E_I$ appears at the output terminals of Hall generator 21 in such a manner that the left terminal is negative and the right terminal is positive (negative product voltage). Due to the blocking action of the diode 26c no current can flow through the coil of indicating instrument 25a. Instead, the current flows from the positive (right) terminal of Hall generator 21 to the coil of instrument 25b and thence through diode 26a to the negative (left) terminal of Hall generator 21. Analogously, the output terminals of the Hall generator 23 furnish a negative product voltage which corresponds to the value of −7 scale divisions. From the right (positive) terminal of generator 23, the current flows to the coil of indicating instrument 25b and thence through diode 26b to the left (negative) pole of generator 23. However, since the voltage of Hall generator 21, having the same polarity as the voltage of Hall generator 23, is larger than the latter voltage, the instrument 25b can respond only to the larger voltage of −14 scale divisions issuing from Hall generator 21. A compensating current cannot flow between the two Hall generators because of diodes 26a and 26b. At the same time, the output voltage of the generator 21 is connected, on the one hand directly and, on the other hand, through the diode 26f with the two poles of diode 26d. As a result, this voltage of 14 scale divisions is added to the voltage of −7 scale divisions furnished from the generator 23, so that the instrument 25c receives a voltage of +7 scale divisions.

Analogously, the output voltage of Hall generator 24 corresponds to an unbalance indication of −3 scale divisions; and the voltage at the output terminals of Hall generator 22 corresponds to an unbalance indication of +11 scale divisions. Due to the voltage at the output terminals of generator 24, and for the reasons described above, no current can flow through the coil of instrument 25d, but only through the coil of instrument 25e and the diode 26a'. Simultaneously, the output voltage of generator 24 is impressed upon the poles of the diode 26d'. Thus, this voltage of three units is added to the eleven-unit voltage furnished from generator 22, so that fourteen voltage units become effective in the coil of instrument 25f.

In the event that only positive values are impressed upon the Hall generators in the two planes, only the directly correlated instruments (25a for plane $E_I$, 25c for plane $E_{III}$) can perform an indication.

In summary, the apparatus described above with reference to FIG. 2 is capable of directly indicating for each of the three reference planes which particular quantities of material must be drilled away from the mass of the workpiece at the particular location of the reference plane.

While reference is made in the foregoing to instrument units 25a through 25f as being of the indicating type, it is an essential advantage of the invention that the unbalance-identifying output magnitudes are available as direct voltages so that the instrument units 25a to 25f may also be directly employed for electric control purposes of any kind, including the automatic control of the unbalance-correcting machining operation.

The method and apparatus according to the invention, as exemplified by the above-described embodiment, operate without any switching contact thus completely eliminating an important trouble source. The invention further affords the use of voltmeters or indicating devices of simpler design and more accurate performance than wattmeters, and lends itself readily to the above-mentioned automatic control of unbalance-correcting devices, computers or other equipment, without any interposition of auxiliary switch contacts.

The invention is applicable to advantage for a great variety of balance-analyzing or balance-correcting problems. It may be used, for example, in lieu of the known electronic-tube devices, or the mechanical or photoelectrical scanning methods heretofore used in automatic balancing devices of the wattmetric type. In all of these cases the invention is applicable for operation at subcritical as well as at supercritical speeds of workpiece rotation.

We claim:

1. Apparatus for analyzing unbalance of rotors, comprising means for causing the rotor to perform unbalance-responsive oscillations, source means for producing two phase-displaced reference voltages synchronous with the rotor oscillations, correction determining means for indicating the unbalance correction required in two coordinate components corresponding respectively to the phase-displaced reference voltages; said correction determining means including two oscillation transducers having respective alternating voltages responsive to said rotor oscillations in two respective reference planes axially spaced from each other, three direct-current receiving units of which two are correlated to said two respective reference planes and the third is correlated to another plane axially spaced from said two planes, two Hall voltage generators each having two input circuits and an output circuit, one input circuit of each generator being connected to and energized by said alternating reference voltage, circuit means for supplying voltage from one of said transducers to the other input circuit of one of said Hall-voltage generators, circuit means for supplying voltage from the other transducer to the other input circuit of said other Hall-voltage generator, two of said receiving units being connected in said respective output circuits, two diodes connected in said respective output circuits in series with said respective two units whereby said two units are energized only when the voltages of said respective output circuits have a given polarity, and a network of diodes connecting said two output circuits with said third unit, said network diodes being poled to energize said third unit by the larger one of said output-circuit voltages having a polarity opposite to the given polarity, whereby the response of said third unit is indicative of the unbalance correction required in said other reference plane.

2. The method of sensing unbalance of rotors in two coordinate directions of at least two reference planes and transforming the measured unbalance values into two coordinate correction values applicable in another plane, which comprises the procedure of rotating the rotor to produce oscillations due to rotor unbalance, transducing the oscillations into respective alternating voltages indicative of unbalance in said respective reference planes, generating an alternating phase-reference voltage synchronous with the rotor rotation having a predetermined first phase position relative to the rotor, impressing the reference voltage and one of the transducer voltages upon a voltage multiplier and impressing the reference voltage and the other transducer voltage upon another voltage multiplier to obtain two product voltages which have each a direct-voltage component of reversible polarity, impressing each product voltage of positive polarity only upon one of two respective receiving means correlated to said two respective reference planes, whereby the response of the two receiving means is indicative of the unbalance correction required in one of the two coordinate radial directions in each of said respective reference planes when both product voltages are positive; and impressing, when the product voltages are negative, the larger one of the negative product voltages upon another receiving means, and simultaneously impressing said larger negative product voltage additively upon the receiving means for the reference plane of the smaller negative product voltage, whereby the response of the other receiving means is indicative of the unbalance correction required in the one of the two coordinate radial directions of the other plane, and duplicating the procedure while generating the alternate phase-reference voltage synchronous with rotor rotation at a second predetermined phase position displaced from the first.

3. Apparatus for sensing unbalance of rotors as to magnitude and phase position in at least two reference planes and transforming the sensed unbalance values into correction values applicable in at least one other plane, comprising means for rotating the rotor to produce oscillations due to rotor unbalance, correction determining means for indicating the unbalance correction requirement in two coordinate components of the three radial planes; said correction determining means including two transducers responsive to said oscillations in said respective two reference planes to provide respective alternating voltages, a source of constant amplitude alternating reference voltage synchronous with the rotor rotation, two voltage multipliers of which each has two input circuits and two output leads, said transducers being connected to one input circuit of each multiplier, said source being connected to the other two input circuits whereby each multiplier furnishes between said two output leads a product voltage having a direct-voltage component of reversible polarity, two direct-current receiving devices and two electric valves, each receiving device and one of said respective valves being connected in series with each other between the two output leads of each of said respective multipliers, said two valves being poled for response of said two devices to only positive values of said direct-current components, another direct-current receiving device having two circuit leads of which one is connected to one output lead of each multiplier and the other is connected to the other output lead of each multiplier, and further electric valve means interposed between said two circuit leads of said other device and said respective multipliers, said further valve means being poled to make said other device respond only when at least one of said product voltages is negative, whereby the response of said other device is indicative of correction required in said other plane.

4. Apparatus for sensing unbalance of rotors in at least two radial reference planes axially spaced from each other relative to the rotation axis of the rotor and transforming the sensed unbalance values into modified values applicable to an auxiliary radial plane differing from said reference planes, comprising rotor drive means for causing the rotor to produce unbalance-responsive oscillations, first correction determining means for indicating the unbalance correction required in one of two coordinate components of the three radial planes; said correction determining means including two oscillation-responsive transducers corresponding to said two reference planes for providing alternating voltages indicative of rotor unbalance in said respective reference planes, a source of alternating phase-reference voltage synchronous with said transducer voltages and phase correlated with one of said components, voltage multipliers of which each has two input circuits and one pair of output leads, one input circuit of each multiplier being connected to said source, said other input circuits being connected to said respective transducers whereby each of said two pairs of output leads furnishes a product voltage having a direct-voltage component whose magnitude and polarity are indicative of the product of said reference voltage times one of said respective transducer voltages, a first pair of voltage-responsive receiving devices and a first pair of electric valve members, one of said devices and one of said valve members being connected in series with each other to each of said respective pairs of output leads whereby each of said devices responds when said direct-voltage component has a given polarity so that the response of the device is indicative of unbalance correction required in one of said respective reference planes; a third voltage-responsive receiving device correlated to said auxiliary plane and having two terminals of which one is connected to one output lead of each of said generators, a second pair of electric valve members connecting said other terminal with the other output lead of each of said multipliers, said two latter valve members having both the same poling relative to said third device, which poling is inverse to that of said first pair of valve members relative to said first pair of devices, whereby said third device responds to the larger one of said two product voltages which departs from said given polarity; and a third pair of electric valve members of which each has one side connected to one of said first pair of devices at a circuit point intermediate said latter device and the one first valve member series-connected therewith and has the other side connected to the other device of said first device-pair at a point directly intermediate said device and the appertaining one of said two multipliers, said third pair of valve members having the poling required to additively supply one of said respective devices of said first pair with voltage from the multiplier of the other device of said pair when the product voltage of said latter multiplier departs from said given polarity, whereby, in the event any of said product voltages departs from said given polarity, the response of said three devices is indicative of the respective unbalance corrections required in said three planes; said source having a second synchronous output voltage phase displaced from the first voltage in correlation to the other of the two components, and second correction determining means coacting with said first correction determining means for causing indication of unbalance correction required in another of the two coordinate components of the three radial planes.

5. Apparatus for sensing unbalance of rotors in two radial reference planes axially spaced from each other relative to the rotation axis of the rotor and transforming the sensed unbalance values into modified values applicable to an auxiliary radial plane intermediate said reference planes, comprising rotor rotating means for causing the rotor to produce unbalance-responsive oscillations, first correction determining means for indicating the unbalance correction required in one of two coordinate components of the three radial planes; said correction determining means including two oscillation-responsive transducers for providing alternating voltages indicative of rotor unbalance in said respective two reference planes, a voltage source coupled with said rotating means to furnish alternating reference voltage synchronous with the rotation of the rotor and phase correlated with one of said components, two Hall voltage generators of which each has two input circuits and one pair of output leads, one input circuit of each generator being connected to said source, said other input circuits being connected to said respective transducers whereby each of said two pairs of output leads furnishes a product voltage having a direct-voltage component whose magnitude and polarity are indicative of the product of said reference voltage times one of said respective transducer voltages times the cosine of the angle between them, a first pair of voltage-responsive receiving devices and a first pair of diodes, one of said devices and one of said diodes being connected in series with each other to each of said respective pairs of output leads whereby each of said devices responds when said direct-voltage component has a given polarity so that the response of the device is indicative of unbalance correction required in one of said respective reference planes; a third voltage-responsive receiving device correlated to said auxiliary plane and having two terminals of which one is connected to one output lead of each of said generators, a second pair of diodes connecting said other terminal with the other output lead of each of said generators, said two latter diodes having both the same poling relative to said third device, which poling is inverse to that of said first pair of diodes relative to said first pair of devices, whereby said third device responds to the larger one of said two product voltages which departs from said given polarity, and a third pair of diodes of which each has one side connected to one of said first pair of devices at a circuit point intermediate said latter device and the one first diode series-connected therewith and has the other side connected to the other device of said first pair at a circuit point directly intermediate said other device and the appertaining one of said two generators, said third pair of diodes having the poling required to additively supply one of said respective devices of said first pair with voltage from the generator of the other device of said pair when the product voltage of said latter generator departs from said given polarity, whereby, in the event any of said product voltages departs from said given polarity, the response of said three devices is indicative of the respective unbalance corrections required in said three planes; said source having a second synchronous output voltage phase displaced from the first voltage in correlation to the other of the two components, and second correction determining means coacting with said first correction determining means for causing indication of unbalance correction required in another of the two co-ordinate components of the three radial planes.

6. Apparatus for analyzing the unbalance of rotors, comprising means for causing the rotor to perform unbalance-responsive oscillations, source means for producing two phase-displaced reference voltages synchronous with the rotor oscillations, first correction determining means for indicating the unbalance correction required in one of two coordinate components corresponding respectively to the phase-displaced reference voltages; said first correction determining means including two oscillation transducers having respective alternating voltages responsive to said rotor oscillations in two respective reference planes axially spaced from each other, three direct-current receiving units of which two are correlated to said respective reference planes and the third is correlated to a plane axially spaced from said two planes, two Hall-voltage generators each having two input circuits and an output circuit, one input circuit of each generator being connected to and energized by said alternating reference voltage, circuit means for supplying voltage from one of said transducers to the other input circuit of one of said Hall-voltage generators, circuit means for supplying voltage from the other transducer to the other input circuit of said Hall-voltage generator, two of said receiving units being connected in said respective output circuits, two diodes connected in said respective output crcuits in series with said respective two units whereby said two units are energized only when the voltages of said respective output circuits have a given polarity, and a network of diodes connecting said two output circuits with said third unit, said network diodes being poled to energize said third unit by the larger one of the output-circuit voltages having a polarity opposite to the given polarity, whereby the response of said third unit is indicative of the unbalance correction required in said other reference plane; second correction determining means correlated with the other of said reference voltages for causing an indication of the unbalance correction required in the other coordinate component.

7. Apparatus for analyzing the unbalance of rotors, comprising means for causing the rotor to perform unbalance-responsive oscillations, source means for producing two phase-displaced reference voltages synchronous with the rotor oscillations, first correction determining means for indicating the unbalance correction required in one of two coordinate components corresponding respectively to the phase-displaced reference voltages; said first correction determining means including two oscillation transducers having respective alternating voltages responsive to said rotor oscillations in two respective reference planes axially spaced from each other, three direct-current receiving units of which two are correlated to said respective reference planes and the third is correlated to a plane axially spaced from said two planes, two Hall-voltage generators each having two input circuits and an output circuit, one input circuit of each generator being connected to and energized by said alternating reference voltage, circuit means for supplying voltage from one of said transducers to the other input circuit of one of said Hall-voltage generators, circuit means for supplying voltage from the other transducer to the other input circuit of said Hall-voltage generator, two of said receiving units being connected in said respective output circuits, two diodes connected in said respective output circuits in series with said respective two units whereby said two units are energized only when the voltages of said respective output circuits have a given polarity, and a network of diodes connecting said two output circuits with said third unit, said network diodes being poled to energize said third unit by the larger one of the output-circuit voltages having a polarity opposite to the given polarity, whereby the response of said third unit is indicative of the unbalance correction required in said other reference plane; second correction determining means correlated with the other of said reference voltages for causing an indication of the unbalance correction required in the other coordinate component; said second correction means including two oscillation transducers having respective alternating voltages responsive to said rotor oscillations in two respective reference planes axially spaced from each other, three direct-current receiving units of which two are correlated to said respective reference planes and the third is correlated to a plane axially spaced from said two planes, two Hall-voltage generators each having two input circuits and an output circuit, one input circuit of each generator being connected to and energized by said alternating reference voltage, circuit means for supplying voltage from one of said transducers to the other input circuit of one of said Hall-voltage generators, circuit means for supplying voltage from the other transducer to the other input circuit of said Hall-voltage generator, two of said receiving units being connected in said respective output circuits, two diodes connected in said respective output circuits in series with said respective two units whereby said two units are energized only when the voltages of said respective output circuits have a given polarity, and a network of diodes connecting said two output circuits with said third unit, said network diodes being poled to energize said third unit by the large one of the output-circuit voltages having a polarity opposite to the given polarity.

References Cited in the file of this patent

UNITED STATES PATENTS

| | | |
|---|---|---|
| 2,730,899 | Hellar et al. | Jan. 17, 1956 |
| 2,731,834 | Fehr et al. | Jan. 24, 1956 |
| 2,736,822 | Dunlap | Feb. 28, 1956 |
| 2,787,907 | King | Apr. 9, 1957 |
| 2,814,015 | Kuhrt | Nov. 19, 1957 |
| 2,851,885 | Federn et al. | Sept. 16, 1958 |
| 2,852,732 | Weiss | Sept. 16, 1958 |
| 2,947,172 | King | Aug. 2, 1960 |
| 2,980,331 | Gruber et al. | Apr. 18, 1961 |
| 2,985,833 | Trimble | May 23, 1961 |

FOREIGN PATENTS

| | | |
|---|---|---|
| 781,827 | Great Britain | Aug. 28, 1957 |